United States Patent
Ying et al.

(10) Patent No.: US 6,990,525 B1
(45) Date of Patent: Jan. 24, 2006

(54) SYSTEM FOR SELECTING DATA COMMUNICATIONS SERVICE

(75) Inventors: Zhang Ying, Beijing (CN); Tapio Hämeen-Anttila, Helsinki (FI)

(73) Assignee: Nokia Corporation, Espoo (FI)

( * ) Notice: Subject to any disclaimer, the term of this patent is extended or adjusted under 35 U.S.C. 154(b) by 701 days.

(21) Appl. No.: 09/671,517

(22) Filed: Sep. 26, 2000

(51) Int. Cl.
*G06F 15/16* (2006.01)
*G06F 15/173* (2006.01)

(52) U.S. Cl. ..................... 709/227; 709/226
(58) Field of Classification Search ............... 709/219, 709/244, 227, 225, 226
See application file for complete search history.

(56) References Cited

U.S. PATENT DOCUMENTS

| | | | | |
|---|---|---|---|---|
| 5,088,052 A | * | 2/1992 | Spielman et al. | 345/804 |
| 5,958,006 A | * | 9/1999 | Eggleston et al. | 709/219 |
| 5,964,839 A | | 10/1999 | Johnson et al. | |
| 6,029,203 A | * | 2/2000 | Bhatia et al. | 709/244 |
| 6,243,754 B1 | * | 6/2001 | Guerin et al. | 709/227 |
| 6,269,395 B1 | * | 7/2001 | Blatherwick et al. | 709/219 |
| 6,282,519 B1 | * | 8/2001 | Peters et al. | 705/34 |
| 6,301,568 B2 | * | 10/2001 | Globuschutz | 705/34 |
| 6,476,521 B1 | * | 11/2002 | Lof et al. | 307/105 |

* cited by examiner

*Primary Examiner*—Paul H. Kang
(74) *Attorney, Agent, or Firm*—Banner & Witcoff, Ltd.

(57) ABSTRACT

A system for selecting a data communications provider. A decision making agent establishes a framework for making the decision based on specific criteria and specific logic. The decision making agent draws on databases which store the quality of service requirements and the parameters regarding each service provider. This information may be updated automatically. When a decision is reached, it is suggested to the user who either accepts it or overrides it and manually inputs his own decision. The connection is then made automatically or scheduled for later connection.

18 Claims, 3 Drawing Sheets

SYSTEM FOR SELECTING DATA COMMUNICATIONS SERVICE

BACKGROUND OF THE INVENTION

1. Field of the Invention

This invention relates generally to a system for selecting a data communications service, and more particularly to a system for selecting a preferred service using a decision making agent and based on decision making logic.

2. Background

The use of data communications has become very common, to the point that in some cases, companies and individuals may have a choice between services which they use. That is, they may be connected to a number of different providers who have different pricing schemes. In addition, some providers may have better quality of service or better security. If a company or individual is connected to a number of different providers, it is necessary to determine which provider to use for each job.

For a larger company, it is possible that several different providers are accessible through a plurality of channels to obtain various types of data communications service. For example, it is possible to have channels through an incumbent local exchange carrier, such as one of the legacy providers, like AT&TJ. The company may also have a channel for competitive local exchange carriers, such as COVAD. There may also be channels from internal information technology support and external information technology providers. Internet service providers may also be connected. The company may also have more than one access devices such as voice band modems, any one of a set of new technologies which provide high speed data transmission such as HDSL, ADSL, SDSL, IDSL, or VDSL or a cable modem.

Of course, if the user as only a single provider, there is no choice to make. Also, if there are a very small number of choices, it may be easy to determine which to use on a manual basis. However, for companies which have a number of different types of channels provided by different services, the billing schemes and other parameters may be quite complex and difficult to compare for different situations. Accordingly, it is helpful to have a built-in system for automatically determining which provider will provide the most appropriate service for a given situation.

SUMMARY OF THE INVENTION

Accordingly, the present invention provides a system for deciding which of several service providers to use.

The invention also provides an apparatus for deciding which service provider to use based on certain decision making logic.

The present invention also provides a method for making a decision concerning which service provider to use based on certain decision making logic.

The present invention further provides a system for making a decision concerning which data service provider should be used based on certain decision making logic and decision making criteria.

The present invention still further provides a system for determining which data communications service provider should be selected based on certain decision making logic, certain decision making criteria and certain basic information concerning each potential provider.

Briefly, this invention is achieved by providing a series of databases regarding the billing policy and other parameters of the various providers and a decision making agent which utilizes specific decision making criteria and decision making logic to make the decision as to which service provider to use based on the information in the databases.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
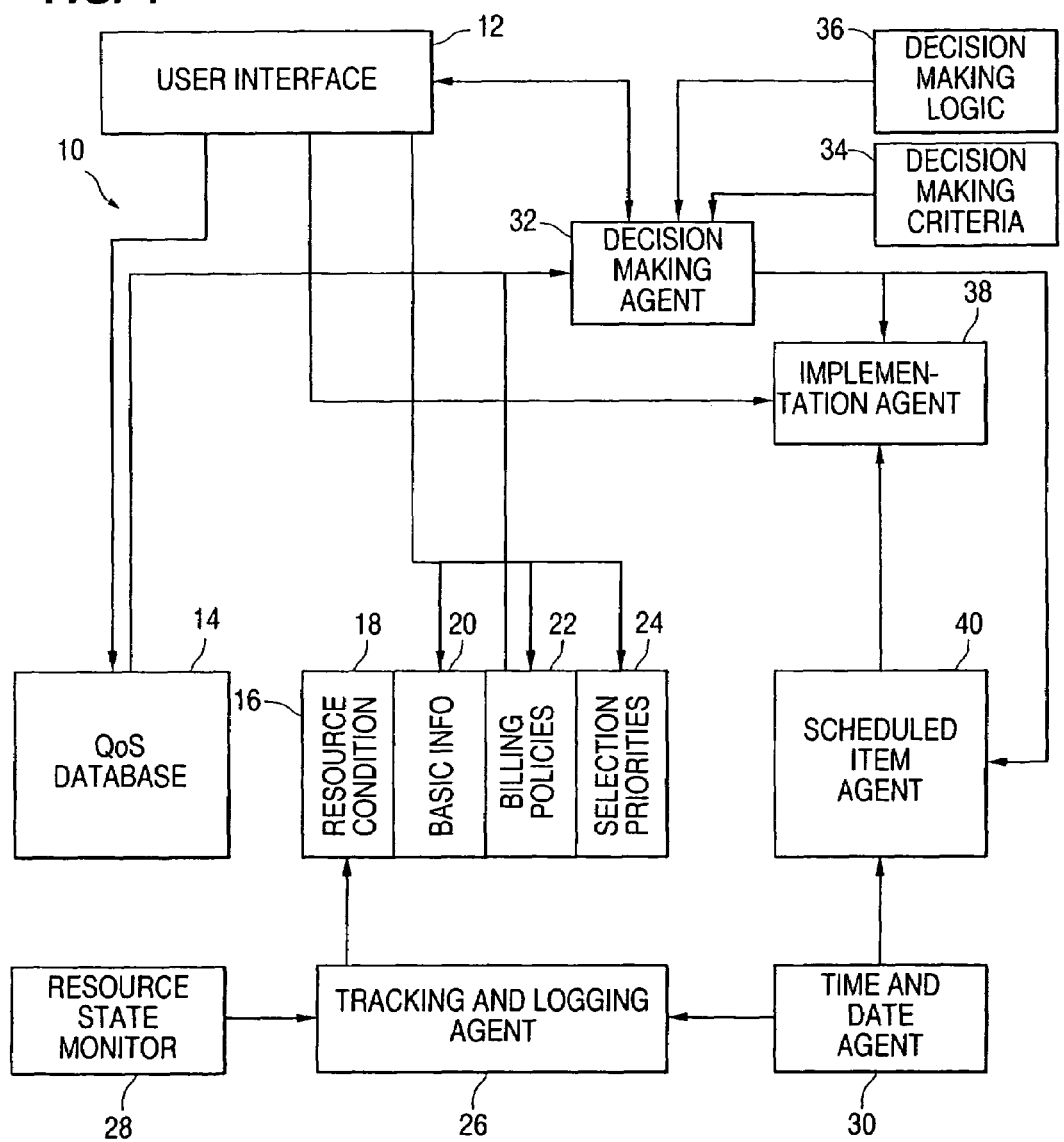
FIG. 1 is a block diagram showing a system description of the present invention.

Referring now to the drawings, wherein like reference numerals designate identical or corresponding parts throughout the several views, and more particularly to FIG. 1 thereof, wherein a block diagram of the system 10 is shown. A user interface 12 is provided so that the user can input information for the databases and input other information regarding other variables such as the type of use for the connection. Any additional quality requirements can also be input by the user. In addition, when a decision has been made as to the most appropriate provider, this will be displayed to the user through the interface so that he may accept or reject the suggestion. The user may also input a decision manually if the user is not happy with the suggested provider.

A quality of service database 14 is provided for storing preconfigured service quality requirements for each service type. This would include delay tolerance, jitter, error or loss tolerance, etc. Some basic requirements for certain applications such as minimum bandwidth are also enclosed in this database. New information can be added to the other database regarding other new service type requirements through the user interface.

Resource database 16 is also provided into which other information regarding parameters of the providers are included. For example, this database can include four parts for different types of information. A resource condition database includes information related to current time and resource states such as the user amount and total throughput. This information can be updated with current online log state information with the more recent information having a higher weight than past information.

The internet service provider resource condition database is assembled in two phases. In the initialization stage, information is input through the user interface about speed pricing policy, etc. Also, if a new connection is added, it is also input manually at that time. The second phase is on-line tracking, for example, through Microsoft Windows™ systems. In this arrangement, you can check the dial-up modem on-line speed and also check the internet protocol throughput of the dial up server.

Another part of the resource database is the resource basic information 20 which includes basic information regarding each provider such as the maximum and minimum bandwidth, the value added service provided and so on. A third part of the database includes billing policies 22 of the providers. Such policies may be complex and may be time dependent, duration dependent or dependent on the amount of information. A fourth part of the database includes selection priorities 24 which can be input manually by the user or may be set by the result of a history normalization. Other parts of this database may also be included to provide any additional information regarding the providers which may be of interest to the decision.

A tracking and logging agent 26 provides real time state of each on-line provider and provides a log of typical information for each provider. This information is used to update the resource condition database. The tracking and logging agent may also be provided with information from a resource state monitor 28 which provides physical information such as line rates and statistical information such as the user amount, service duration, usability time, equipment usage and information amount of the streams for each resource. The tracking and logging agent may also be connected to a time and date agent which merely provides the time and date to help give accurate logs.

The information from these various databases is provided to the decision making agent 32 so that a decision can be made concerning which service provider to use. The decision making agent receives information from the user interface as to the type of use desired and other basic information regarding the specific job at hand. The decision making agent can draw on the decision making logic 36 which has several different logic arrangements based on different decision criteria, such as the connection duration sensitivity which is related to the service capability of each resource, a cost sensitive logic, related to the billing policies and service type, and a quality sensitivity logic which relates to the quality of transmission.

The decision making agent also can receive data regarding the particular criteria to be utilized in making the decision. Thus, the criteria may indicate what parameter should be controlling in making the decision. That is, whether price is the only factor, or whether service or security are more important. This may be input through the user interface along with other information about the specific job or it may be determined based on stored guidelines about different types of situations. This criteria determines which logic to choose from logic circuit 36. This criteria can be user specific and also related to the database. For example, in the pricing criteria, it may have various aspects such as monthly pricing, pricing per user, pricing per click, pricing bandwidth, pricing per packet, pricing per transaction, etc. The decision making is based on certain specific criteria. If the criteria is cost sensitive, then the cheapest rate from the database at a specific time is chosen. If the criteria is time sensitive, then the provider with the highest line rate or internet traffic throughput listed in the database may be chosen. For more complex situations, there may be a confidential sensitive service so that a virtual private network may be chosen rather than a normal service provider.

When the decision making agent is called upon to select a provider, the specific type of decision making logic specified by the decision making criteria will be utilized in order to establish a logic scheme for making the decision. The databases are drawn upon to provide the basic information onto which the decision making logic scheme is applied. Once a decision has been reached, the suggested provider is displayed to the user through the interface. Whether the user accepts this decision or overrides it and provides a new provider choice, this choice is either directly handled by the user on a manual basis or provided to the implementation agent 38 which automatically establishes a connection with the selected provider.

If the specific job for which the provider was selected does not need to be handled on a real time basis, it is possible to send the information to a scheduled item agent 40 rather than automatically connecting to the provider at that time. The scheduled item agent will then make the connection at a later time, perhaps when the data streams in the providers are lighter or when the connections from the user are less busy. It may also be possible to delay the connection in order to obtain a better pricing schedule. The decision as to when to make the connection can also be determined by the decision making agent at the same time that the provider is selected, since the decision may be interrelated.

For example, in order to choose the best internet service provider connection for a certain task, the system may operate in the following manner. Based on the internet service provider connection database and the service requirements from the service requirement database, a decision making agent can provide a selection decision according to various types of criteria, such as cost sensitive, time duration sensitive or quality sensitive. Based on this, it can provide a scheduled connection suggestion and implementation.

Figure 2:
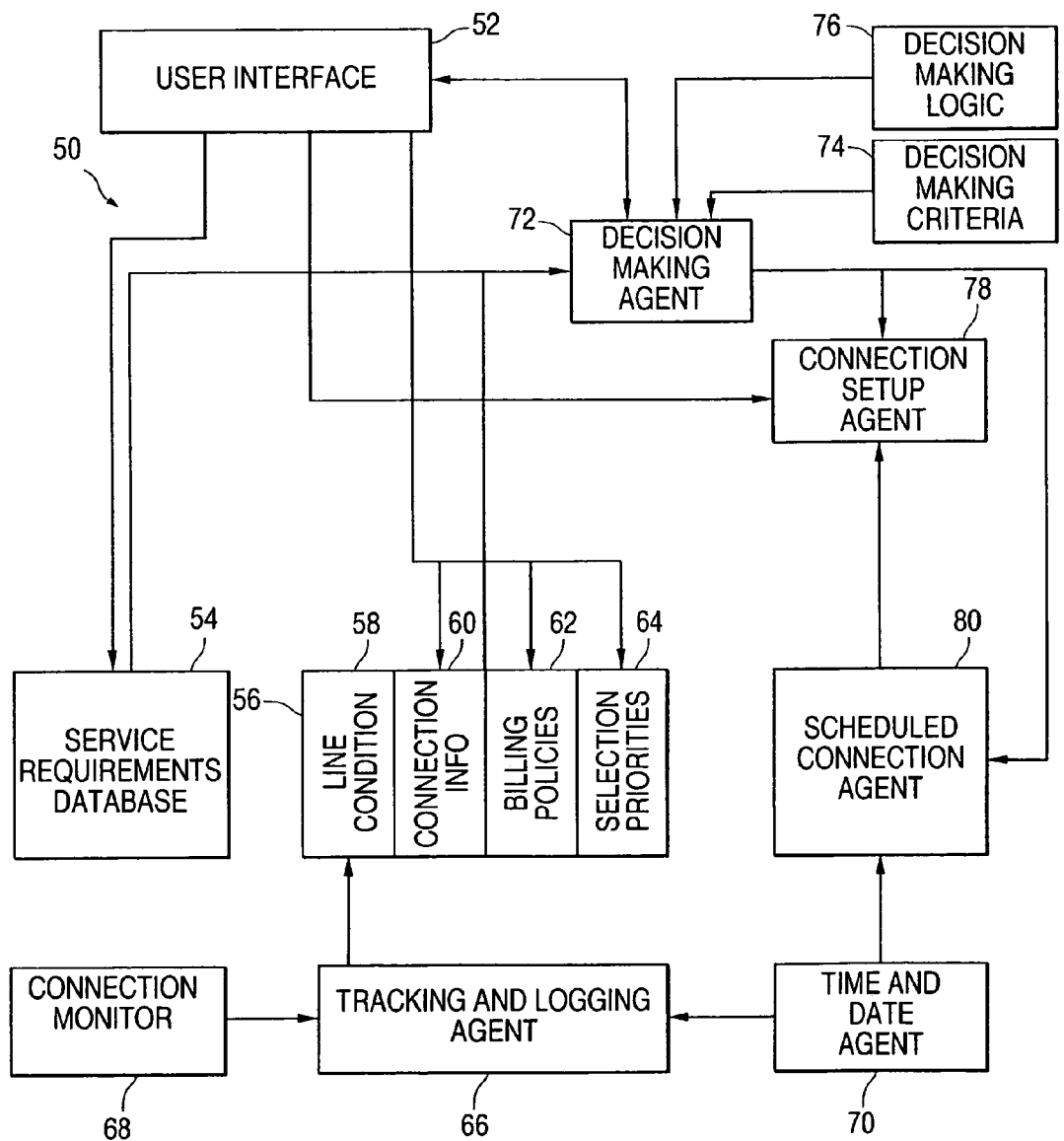
FIG. 2 is a block diagram of a sample system according to the present invention.

FIG. 2 shows a system which is a specific implementation of the system of FIG. 1. This arrangement may be appropriate for a residential user with a limited number of providers from which to choose. The general arrangement of elements is similar to that shown in FIG. 1. The system 50 is shown as including a user interface 52 which corresponds to interface 12 in FIG. 1. A service requirements database 54 is similar to the quality of service database 14 in FIG. 1. In this case, the database lists the requirements for the services which are available to this residential user. A connections database 56 is similar to the resource database 16 in FIG. 1. It also includes four parts including line condition data in 58, connection information in section 60, billing policies in section 62 and selection priorities in section 64. These four correspond to sections 18 to 24 in FIG. 1. However, they are directed to a much smaller number of possible connections. The connections database is also assembled in two phases. In the initialization stage, information is input through the user interface. Similarly, if a new connection is added it is also input manually. The second phase involves on-line tracking using a tracking and logging agent 66. The tracking and logging agent is similar to agent 26 shown in FIG. 1. Also, the connection monitor 68 monitors the state of various connections in a fashion similar to monitor 28 in FIG. 1. Time and date agent 70 is similar to the same agent 30 in FIG. 1. The decision making agent 72 and associated decision making criteria 74 and decision making logic 76 are similar to the same circuits 32–36 shown in FIG. 1. A connection set-up agent 78 provides a connection with the selected provider in a similar fashion to the implementation agent 38 in FIG. 1. Also, the scheduled connection agent 80 provides a schedule for connecting to various providers in the future in a similar fashion to scheduled item agent 40 in FIG. 1. Thus, this system operates in a similar fashion to FIG. 1 in that basic information about the various providers is provided through the interface. The decision making agent draws on the decision making logic and the decision making criteria to provide a logic scheme for making the decision. Databases 54 and 56 provide information about the providers so that a decision can be made based on these parameters. Once a decision is made, it is displayed to the user so that he can accept it or indicate his different choice. The result is then either scheduled in agent 80 for later connection or connection set-up agent 78 provides the connection at that time.

While these two figures have been described in terms of specific circuits to provide these different functions, it is also possible to utilize a general purpose computer with specific programming for each of these functions.

Figure 3:
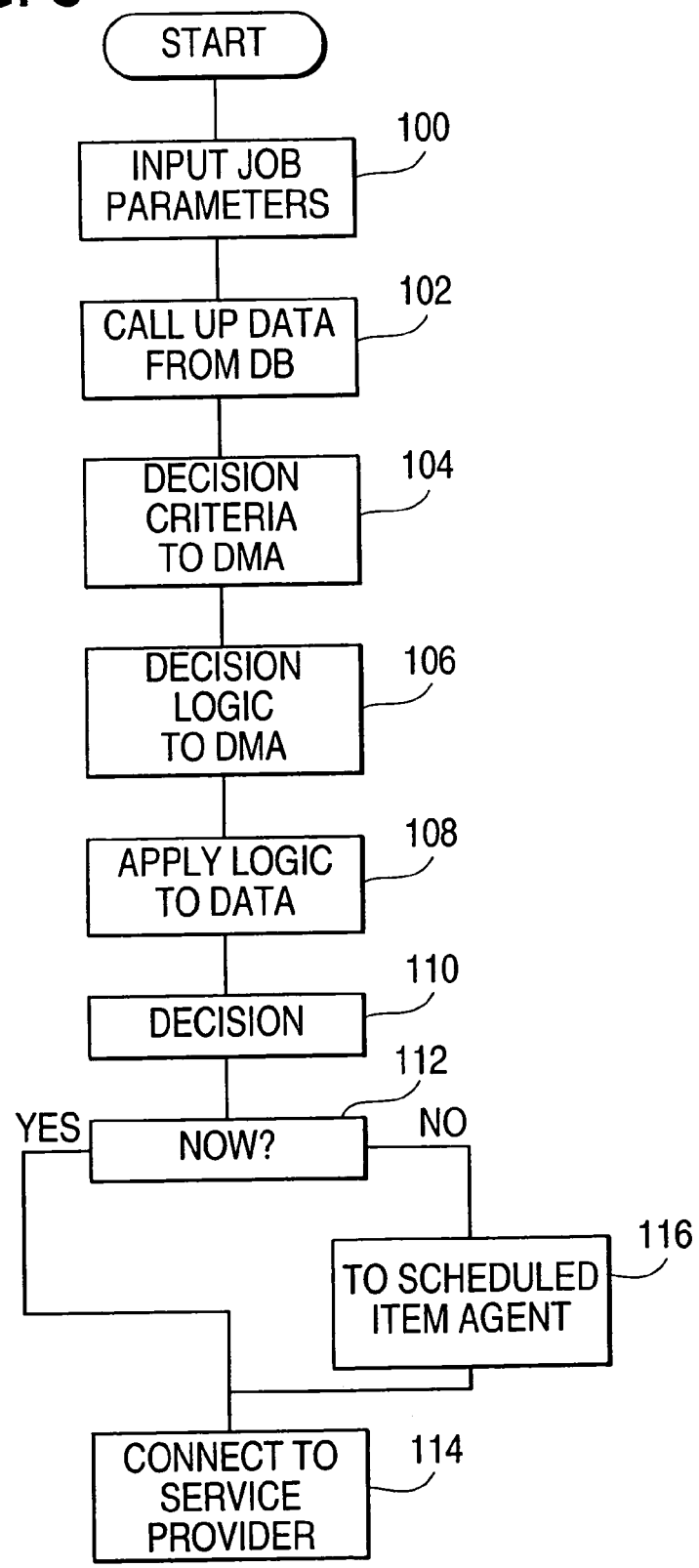
FIG. 3 is a flow chart showing the steps of the method according to the present invention.

FIG. 3 shows the basic steps of making a decision using the system shown in FIG. 1. In step 100 the user indicates a desire to make a connection and also provides some information about the particular job situation and the necessary parameters associated therewith. These parameters might include the length of time estimated for a connection, the importance of the information, the necessity for security and the timeliness of the information.

In step 102, the decision making agent will call up data from the databases 14 and 16 to determine the present situation regarding the providers and also the basic requirements of quality for the service. The decision making agent will also then in step 104 receive the decision criteria from the decision making criteria unit 34. The criteria will indicate which logic to choose from the decision making logic unit 36 which is then forwarded to the decision making agent in step 106.

In step 108, the decision making agent will then apply the appropriate decision making logic to the specific data involved in this situation in order to make a decision as to which provider to choose. The decision is made in step 110. At the time, a decision is made as to whether the connection should be made at the present time or should be deferred until later. This decision is made in step 112. If the connection is to be made at the present time, the implementation agent 38 is called upon to proceed to make the connection to the selected service provider in step 118. If the connection is not to be made now, the information regarding when it should be sent is sent to the scheduled item agent 40 in step 116. At the appropriate time, the scheduled item agent then sends the information about the connection to the implementation agent in step 114 who then connects to the service provider in step 118 in the same manner.

Numerous additional modifications and variations of the present invention are possible in light of the above teachings. It is, therefore, to be understood that within the scope of the appended claims, the invention may be practiced otherwise than as specifically described herein.

What is claimed is:

1. An apparatus for selecting one of a plurality of service providers for connection to a computer system through a network, the apparatus comprising:
   at least one database containing data regarding parameters of each service provider and service quality requirements for service types; and
   a decision making unit connected to said at least one database for selecting one of said plurality of service providers to be connected to said computer system, said selecting being made according to decision making criteria and said data from said at least one database, and wherein said decision making unit includes a criteria unit for selecting criteria from multiple criteria to be used in making a decision for selecting one of the service providers and a decision making agent unit for making the decision based on said selected criteria; and
   a scheduling agent, which is coupled to the decision making unit, for controlling connection of the computer system to the selected service provider at a selected time.

2. The apparatus according to claim 1, further comprising an interface unit for displaying to a user the selected data provider.

3. The apparatus according to claim 1, further comprising an implementation agent for connecting said computer system to said selected provider.

4. The apparatus according to claim 1, further providing a tracking unit for updating data in said at least one database based on current conditions in said service providers.

5. The apparatus according to claim 1, wherein said decision making unit further includes a logic unit for providing logic based on different decision criteria to said decision making agent unit.

6. The apparatus according to claim 1, wherein said at least one database includes a first database for storing service quality requirements of each service type and a second database for storing parameters regarding each provider, including billing data, selection priority data, resource condition data and resource information data.

7. The apparatus of claim 1 comprising:
   a user interface coupled to the decision making unit which provides information relating to a type of service to be provided from the service providers and information to be used in making a decision of selecting a service provider from the multiple service providers by the decision making unit.

8. A method of selecting one of a plurality of service providers for connection to a computer system through a network, said method comprising:
   storing data in at least one database regarding parameters of each service provider and service quality requirements for service types;
   retrieving data from said at least one database;
   selecting criteria from multiple criteria for making a decision related to said parameters and said service quality requirements; and
   selecting one of said plurality of providers to be connected to said computer system based on said data stored by said at least one database and based on said selected criteria; and
   scheduling a selected time for connection of the computer system through the network to the selected service provider.

9. The method according to claim 8, further comprising: providing logic based on different decision criteria so that said selecting is also based on said logic.

10. The method according to claim 8, further comprising displaying said selected provider to a user for approval.

11. The method according to claim 10, further comprising automatically connecting said computer system to said selected provider.

12. The method according to claim 8, further comprising: updating said at least one database based on the real time state of each provider.

13. The method according to claim 8, wherein said at least one database includes a first database for storing service quality requirements for each service type and a second database for storing resource data concerning each provider, including billing policies, selection priorities, resource condition data and resource information.

14. The method of claim 8 comprising:
   providing from a user interface information relating to a type of service to be provided from the service provider and information to be used in making a decision of selecting a service provider from the multiple service providers.

15. A system comprising:
a network;
service providers;
a computer system selectively connected through said network to said service providers; and
a selection device for selecting which service provider should be utilized, said selection device including at least one database storing data regarding parameters about each service provider and service quality requirements for service types and a decision making unit for making said selection based on said data stored in said at least one database and on decision making criteria for selecting criteria from multiple criteria to be used in making a decision for selecting one of the service providers to be connected through said network to said computer system; and
a scheduling unit, which is coupled to the decision making unit, for controlling connection of the computer system through the network to the selected service provider at a selected time.

16. The system of claim 15 comprising:
a user interface coupled to the decision making unit which provides information relating to a type of service to be provided from the service providers and information to be used in making a decision of selecting a service provider from the multiple service providers by the decision making unit.

17. A system for selecting one of a plurality of service providers to be connected to a computer system through a network, comprising:
means for storing data in at least one database regarding parameters of each service provider and service quality requirements;
means for retrieving data from said at least one database;
means for selecting criteria from multiple criteria to be used in making a decision for selecting one of the service providers based on said stored data and
means for selecting one of said plurality of service providers to be connected to said computer system through said network based on said stored data from said at least one database and on said selected criteria; and
a scheduling unit, which is coupled to the decision making unit, for controlling connection of the computer system to the selected service provider at a selected time.

18. The system of claim 17 comprising:
a user interface coupled to the decision making unit which provides information relating to a type of service to be provided from the service providers and information to be used in making a decision of selecting a service provider from the multiple service providers by the decision making unit.

* * * * *